United States Patent [19]

Doering et al.

[11] Patent Number: 5,433,760
[45] Date of Patent: * Jul. 18, 1995

[54] METHOD OF QUENCHING SYNTHESIS GAS

[75] Inventors: Egon L. Doering, Pasadena, Tex.; Maarten J. van der Burgt, The Hague, Netherlands

[73] Assignee: Shell Oil Company, Houston, Tex.

[*] Notice: The portion of the term of this patent subsequent to Jul. 11, 2012 has been disclaimed.

[21] Appl. No.: 61,147

[22] Filed: May 13, 1993

[51] Int. Cl.⁶ .............................. C10J 3/46; C01B 3/32; C01B 3/34
[52] U.S. Cl. ................................. 48/197 R; 48/213; 48/215; 252/373
[58] Field of Search .................. 48/197 R, 202, 203, 48/206, 210, 215, 200, 201, DIG. 2, 213, 214 R; 252/373

[56] References Cited

U.S. PATENT DOCUMENTS

| | | | |
|---|---|---|---|
| 2,698,782 | 1/1955 | Coghlan | 48/215 |
| 2,716,597 | 8/1955 | Linder et al. | 48/215 |
| 2,716,598 | 8/1955 | Moses | 48/206 |
| 2,976,134 | 3/1961 | Paull | 48/215 |
| 3,010,813 | 11/1961 | Clarke et al. | 48/197 R |
| 3,784,364 | 1/1974 | Slater et al. | 48/215 |
| 3,904,389 | 9/1975 | Banquy . | |
| 3,963,457 | 6/1976 | Hess | 48/206 |
| 3,980,451 | 9/1976 | McMahon | 48/201 |
| 4,007,018 | 2/1977 | Slater et al. . | |
| 4,054,424 | 10/1977 | Staudinger et al. | 48/DIG. 2 |
| 4,060,397 | 11/1977 | Buiter et al. | 48/197 R |
| 4,082,520 | 4/1978 | Baron et al. | 48/202 |
| 4,125,452 | 11/1978 | Effron . | |
| 4,135,893 | 1/1979 | Roberts | 48/202 |
| 4,211,540 | 7/1980 | Netzer . | |
| 4,211,631 | 7/1980 | Carr et al. . | |
| 4,222,846 | 9/1980 | Schmid . | |
| 4,278,445 | 7/1981 | Stickler et al. | 48/206 |
| 4,278,446 | 7/1981 | Von Rosenberg et al. | 48/202 |
| 4,324,642 | 4/1982 | Durai-Swamy . | |
| 4,375,402 | 3/1983 | Durai-Swamy . | |
| 4,430,096 | 2/1984 | Schnur et al. | 48/197 R |
| 4,547,203 | 10/1985 | Jahnke | 48/206 |
| 4,705,539 | 11/1987 | Najjar et al. . | |
| 4,778,485 | 10/1988 | Suggitt et al. . | |
| 4,801,438 | 1/1989 | Najjar et al. . | |
| 4,801,440 | 1/1989 | Najjar et al. . | |
| 4,808,386 | 2/1989 | Najjar et al. . | |
| 4,810,264 | 3/1989 | Dewitz | 48/DIG. 2 |
| 4,872,886 | 10/1989 | Henley et al. | 48/202 |
| 4,880,439 | 11/1989 | Najjar et al. . | |
| 4,954,136 | 9/1990 | Jokisch et al. | 48/DIG. 2 |
| 5,181,943 | 1/1993 | Weber | 48/DIG. 2 |

Primary Examiner—Peter Kratz
Attorney, Agent, or Firm—Timothy J. Hadlock

[57] ABSTRACT

The invention is a process for quenching a first synthesis gas mixture containing synthesis gas, molten flyash, water, and carbon dioxide and producing additional synthesis gas consisting of (a) passing the first synthesis gas mixture into a first quench zone; (b) introducing into the quench zone a mixture of a liquid carbonaceous quenching medium in a nitrogen or carbon dioxide carrier gas; (c) endothermically reacting the liquid carbonaceous quenching medium with the water and the carbon dioxide in the synthesis gas mixture, thus producing additional synthesis gas consisting of hydrogen and carbon dioxide, and wherein the additional synthesis gas is admixed with the first synthesis gas mixture to form a second synthesis gas mixture; (d) passing the second synthesis gas mixture to a second quench zone; (e) introducing into the second quench zone a cooling gas for admixture with the second synthesis gas mixture, thus cooling the second synthesis gas mixture, where the molten flyash is solidified, and thus forms a third synthesis gas mixture; and (f) passing the third synthesis gas mixture to a solids removal stage for removing the solidified flyash.

20 Claims, 1 Drawing Sheet

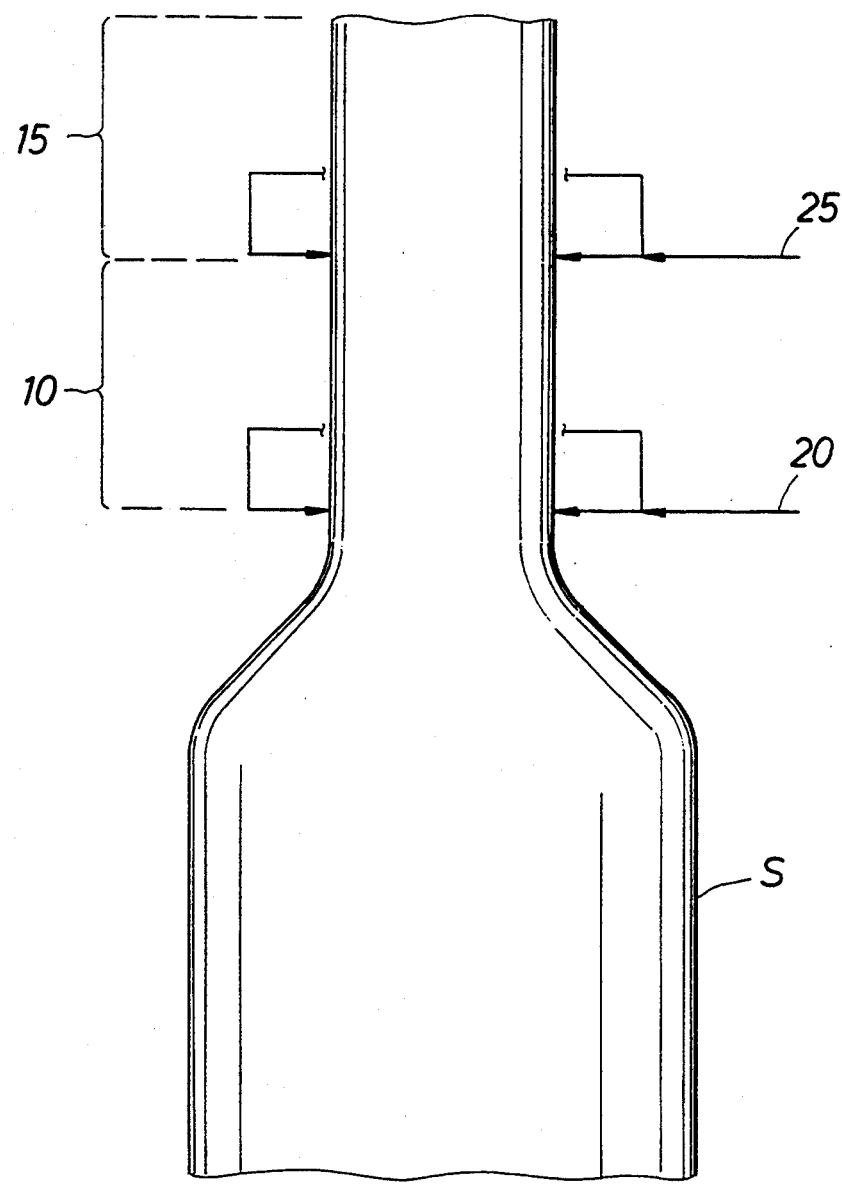

METHOD OF QUENCHING SYNTHESIS GAS

FIELD OF THE INVENTION

The invention relates to a two-stage quenching method for a synthesis gas stream by first injecting a liquid carbonaceous quenching medium into a gasifier effluent and then injecting a cooling gas into the resulting mixture.

BACKGROUND OF THE INVENTION

The combustion of a carbonaceous material such as a solid carbonaceous fuel by reaction with a source of gaseous oxygen is well known. In such a reaction, an amount of air or oxygen equal to or greater than that required for complete combustion is used, whereby the gaseous effluent contains carbon dioxide with little, if any, carbon monoxide. It is known also to carry out the gasification or partial oxidation of solid carbonaceous materials or fuels employing a limited quantity of oxygen or air so as to produce primarily carbon monoxide and hydrogen.

The gases resulting from partial combustion or gasification of solid carbon-containing fuels such as coal have value as residential, commercial, and industrial fuels. The resulting gases also have value as starting materials for the synthesis of chemicals and fuels and as an energy source for the generation of electricity. These uses have long been recognized and partial gasification has been practiced on varying scales throughout the world. In the case of coal gasification, a number of different gasification processes have been developed to take into account factors such as the coal source employed, the gasifying medium used and the use sought to be made of the product gas.

While these processes may be classified in a variety of ways, they generally fall into two distinct groups. The two groups are distinguished with respect to the condition in which the non-carbonaceous, mineral residue is removed from the gasification zone. The residue is removed as a dry ash in a nonslagging operation or as a slag in a slagging operation. These two processes are different primarily due to the temperatures employed in the gasification zone itself. The nonslagging gasifiers are operated at lower reaction temperatures, usually less than 1400° C. This is below the temperature at which the contained ash will fuse. The temperatures employed in slagging gasifiers are usually 1500°–2700° C. These temperatures are sufficient to convert the dry ash into a molten slag.

Advantages exist for gasification processes in each of the two process groups. The processes employing slagging coal gasifiers, however, are generally considered to be the most flexible, at least in terms of the variety of coal feedstocks which can be employed. The operation of coal gasifiers under nonslagging conditions is generally limited to coals of low ash content because of the difficulty in removing ash with grates and other mechanical devices. In contrast, in operations at slagging conditions, almost any coal can be suitably employed because the ash becomes a free-flowing fluid. As a result, the fluid ash is quite simply and easily removed from the gasifier. A good general review of a variety of coal gasification processes appears in the Kirk-Othmer Encyclopedia of Chemical Technology, 2nd Ed., Vol. 10, pp. 353-388, Interscience (1966).

One process employing a slagging coal gasifier which has had rather wide application is the Koppers-Totzek process. This process, which is described in an article by F. Totzek in "Brennstoff-Chemie," Vol. 34, pp. 361-367 (1953), has the capability of handling just about any coal including lignites with up to 30% ash or mineral contents. A significant portion of the molten slag is removed at the bottom of the gasifier. However, the raw product gas of this process, like other processes employing slagging gasifiers, still contains a significant quantity of mineral matter. The mineral matter is in the form of a suspension or mist of molten or partly molten particles. In this molten state the ash is sticky.

The slag in coals is caused primarily because of the impure nature of coal and the mineral matter in typical coals. These impurities include mixtures of silica and various metal oxides. The molten or partly molten slag does not have a specific melting point. Instead it solidifies over a wide melting range which may cover many hundreds of degrees which can make processing difficult.

It is typically desired to cool the coal gasifier effluent prior to further processing. In a typical application, the gas leaving the reactor has a temperature, as a rule, higher than 1400° C. (2552° F.), preferably from about 2650° F. to about 3000° F., at which the ash is quite fluid. For further processing, this raw product gas is typically cooled down to, for example, 300° C. In the cooling the gas will pass through a broad range of temperatures at which the slag is sticky. The slag from coal usually is sticky at temperatures greater than about 1800° F. Once the slag particles are no longer sticky, they can be easily removed by known techniques such as cyclones, filters, or similar devices.

In the transition between being highly fluid molten liquid and solid nonsticky particles, these slag particles exhibit sufficient stickiness that they can cause extreme difficulties in processing. That is, the slag adheres to and forms deposits on walls, valves, outlets, etc., of process equipment immediately downstream of the gasifier. These deposits tend to build up and as a result interfere with good operation of the process and even lead to complete blocking.

A previous process has added coal directly to the cooling gas (see U.S. Pat. No. 4,054,424). Such a process is disadvantageous, however, since the gas mixture is cooled too much to provide complete reaction of the added coal particles. As a result, undesirable hydrocarbons such as ringed compounds may be formed that will have to be removed thus requiring additional processing. Another previous process, disclosed in U.S. Pat. No. 2,987,387, provides for diverting of vaporized slurry feed water (i.e., steam) in excess of that required for gasification temperature control. The excess is diverted for use in quenching the gasifier effluent. The diverted excess contains only trace amounts of reactive materials such as powdered or volatilized coal. The weight ratio of steam to coal is less than 1 to 0.1. The excess steam reacts with unreacted coal in the gasifier effluent as well as the trace coal in the excess steam. The addition of steam can cause plugging and fouling problems since it is a condensible substance. In a dry feed system, the addition of steam can wet the coal particles, forming a "mud." Any condensed steam will also have to be separated. Thus another separations unit is required.

Accordingly, it would be advantageous to have a process for cooling the product gas of a slagging coal gasifier in which the harmful effects of the stickiness of molten slag particles contained therein is minimized or even completely eliminated and the disadvantages of previously known processes are avoided.

SUMMARY OF THE INVENTION

The invention is a process for quenching a first synthesis gas mixture containing synthesis gas, molten flyash, water vapor, and carbon dioxide and producing additional synthesis gas by a process including the following steps:

a. passing the first synthesis gas mixture into a first quench zone;

b. introducing into the quench zone a mixture of a major amount of a liquid carbonaceous quenching medium and a minor amount of carrier gas;

c. endothermically reacting the liquid carbonaceous quenching medium with the water vapor and the carbon dioxide in the synthesis gas mixture thus producing additional synthesis gas consisting of hydrogen and carbon monoxide and wherein the additional synthesis gas is admixed with the first synthesis gas thereby forming a second synthesis gas mixture;

d. passing the second synthesis gas mixture to a second quench zone;

e. introducing into the second quench zone a cooling gas for admixture with the second synthesis gas mixture, thereby cooling the second synthesis gas mixture and solidifying the molten flyash, thereby forming a third synthesis gas mixture; and f. passing the third synthesis gas mixture to a solids removal stage for removing the solidified flyash.

This invention provides an improved method for cooling the hot synthesis gas obtained when coal is partially oxidized in an entrained flow slagging coal gasifier. More particularly, this invention provides a process for direct two-stage quenching of the hot synthesis gas of a slagging coal gasifier in two quench zones. The benefit of this process is achieving enhanced efficiency in recovering the energy value of the coal while at the same time minimizing or avoiding the deposition of sticky, molten slag particles on the quench zone walls. It is important to prevent such deposition of sticky slag particles on the process equipment downstream of the gasifier since such deposition can foul and block the equipment.

BRIEF DESCRIPTION OF THE DRAWING

The FIGURE is a schematic representation of a two stage quench zone.

DETAILED DESCRIPTION OF THE EMBODIMENTS

A. Feeds and Feed Preparation

The coal feedstocks employed in the invention generally encompass any coal available in commercial quantities including anthracite, bituminous, sub-bituminous and lignite having mineral contents ranging from less than 5% by weight to 30% by weight. The coal feed is pulverized in a pulverizer. The coal is optionally fed to the gasifier dry or in a water slurry. Dry feed is transported pneumatically in nitrogen or carbon dioxide.

B. Gasifier Types

The process of the invention is applicable to the quenching of the gas effluent of any conventional slagging coal gasifier. Such gasifiers include fully entrained suspension gasifiers or other coal gasifiers operated under atmospheric or superatmospheric conditions. The only proviso is that the synthesis gas mixture from the gasifier should contain some mineral matter in the form of molten or partly molten particles.

In general, these slagging coal gasifiers are operated under partial oxidation conditions to yield CO, $H_2$ and $CO_2$ as the principal gaseous products with methane, water vapor and nitrogen also being present in certain cases. The latter two components are prevalent when steam, air or oxygen-enriched air are employed in the gasifying medium. When operated under slag-forming conditions, the product gas, i.e., first synthesis gas mixture, emanating from the gasifier will generally be at a temperature higher than 1400°C. It contains a suspension or fine mist of sticky molten or partly molten mineral slag particles.

C. Gasifier Operating Conditions

The gasifier is operated at gasifying conditions. These conditions may vary from feed to feed. Typical temperatures in the gasifier are from about 1100° C. (2000° F.) to about 2000° C. (3600° F.). Where the feed is coal, the gasifier temperature is preferably from about 1480° C. (2700° F.) to about 1760° C. (3200° F.). The pressure of the gasifier is greater than about 300 psig and preferably from about 350 psig to about 450 psig.

D. First Quench Zone

The synthesis gas, water vapor, carbon dioxide, and molten slag, i.e., first synthesis gas mixture, are then passed from the gasifier to two or more quenching and/or cooling stages. According to the invention, this first synthesis gas mixture is cooled in a first quench zone. This is achieved by direct mixing of the first synthesis gas with a major amount of a liquid carbonaceous quenching medium in a minor amount of a gas carrier.

As used herein and in the appended claims, "major amount" means greater than 50 percent by weight and "minor amount" means less than 50 percent by weight. Preferably, the weight ratio of liquid carbonaceous quenching medium to carrier gas is greater than 10 to 1. The carrier gas may be any gas that can be mixed with the first synthesis gas mixture without adversely effecting its quality for the desired use. The two gases need not be the same. The carrier gas is nitrogen, recycled cooled synthesis gas, water, or carbon dioxide. Preferably the carrier gas is a gas such as nitrogen or carbon dioxide which is noncondensible under the operating conditions of the process.

The term "liquid carbonaceous quenching mediums" as used in this specification and appended claims means liquid hydrocarbons, asphalt, gas oil, residual fuel oil, coal tar, various organic scrap materials, and amines. Residual fuel oil is the preferred quenching medium.

The carbon in the injected liquid carbonaceous quenching medium will react with carbon dioxide and water in the first synthesis gas mixture to form additional synthesis gas containing carbon monoxide and hydrogen. The reaction equations are as follows:

$$C + H_2O = CO + H_2$$

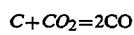

$$C + CO_2 = 2CO$$

This mixing of additional synthesis gas with the first synthesis gas mixture results in a second synthesis gas mixture which is further cooled in the second quench zone. The first synthesis gas mixture enters the first quench zone at conventional flow rates of, e.g., greater than about 10 kg/sec, preferably about 20 kg/sec to about 100 kg/sec. The liquid carbonaceous quenching medium in a carrier gas is most suitably introduced at the entrance of the first quench zone. About 0.5 to about 2 times the stoichiometric amount of liquid carbonaceous quenching medium for the production of hydrogen and carbon monoxide from the water vapor and carbon dioxide in the first synthesis gas mixture are mixed with the first synthesis gas mixture. Since the above reactions are endothermic processes, the first synthesis gas mixture is cooled by the heat adsorbed in the reaction. The cooling is not below the temperature at which the added liquid carbonaceous quenching medium is completely reacted so that undesirable hydrocarbons are not formed. This second synthesis gas mixture leaves the first quench zone and enters the second quench zone at a temperature from about 1900° F. to about 2400° F., preferably from about 2100° F. to about 2400° F.

E. Second Quench Zone

In a second quench zone, the gas from the first quench zone is further cooled by contact with a gas at a lower temperature. The cooling of a gas by intimate mixing with a gas at a lower temperature is very effective and involves no delay. Cooling is thus rapidly effected in a relatively small space. This has great advantages because the temperature range in which the slag particles are sticky is passed through rapidly, therefore the second synthesis gas mixture cooling zone can be small, but is sufficient to cool the slag to solidification.

The quantity of cooling gas required naturally depends on the desired degree of cooling, on the nature and the temperature of the cooling gas, the temperature of the second synthesis gas mixture and the nature of the slag particles. The cooling is to a sufficient degree to solidify the slag particles. The cooling medium is water vapor or any gas that can be mixed with the second synthesis gas mixture without adversely effecting its quality for the desired use. These gases include nitrogen, recycled cooled synthesis gas, water, or steam.

The mixing of the second synthesis gas mixture with the cooling gas results in a third synthesis gas mixture. The cooling of the second synthesis gas mixture progresses to a temperature where the slag particles are no longer sticky. This mixture includes the entrained slag. The slag has been condensed to solid particles. These particles are then easily removed. The third synthesis gas mixture leaves the second quench zone at a temperature from about 1000° F. to about 1900° F., preferably from about 1600° F. to about 1800° F. The cooling gas is introduced downstream of the first quench zone. This cooling gas is optionally introduced through radially directed outlets located at about the same height and equally spaced around the circumference of the quench zone.

F. Quench Zone Physical Parameters

The liquid carbonaceous quenching medium and carrier gas and cooling gas, in the first and second quench zones, respectively, are introduced into the first synthesis gas mixture and second synthesis gas mixture, respectively, in the form of liquid/gas jets. In addition, cooling gas outlets are not located in the stream of synthesis gas mixtures containing sticky slag particles, so that fouling of the outlets is prevented. In most applications the volume ratio of the second synthesis gas mixture to the cooling gas is suitably from 1:0.5 to 1:3.0 with ratios of about 1:0.5 being preferred.

The quench zone is preferably tubular. The diameter of the radially directed cooling gas outlets is chosen such that the gas jets are sufficiently strong to reach the center of the quench zone. Stable gas jets are obtained at a linear gas velocity of about 5 m/s to about 30 m/s.

The distance between the cooling gas inlets in the second quench zone and the liquid carbonaceous quenching medium and carrier gas inlets of the first quench zone will depend on several variables including velocity of the gas stream, diameter of the quench zone, desired conversion of coal, desired cooling, and economic considerations since a longer pressurized zone is more expensive. This distance can be determined by one of ordinary skill in the art once the desired variables are selected.

The first quench zone used in the process according to the invention includes a tube that can be connected to a source of the first synthesis gas mixture to be cooled. The tube is provided with an gas inlet located in the vicinity of that connection. The tube has two or more inlets for providing gas in an annular, radial, or tangential direction. The inlets are equally spaced around the circumference of the quench zone.

G. Solids Removal Stage

As a result of the cooling, the molten slag will condense to form solid particles. The synthesis gas stream containing the solid particles is then optionally further cooled in a heat exchanger and then is passed to one or more solids removal stages. The solids removal stage used depends on the temperature of the gas stream. Cyclones can be used with high temperature streams, but ceramic candle filters are not suitable for stream temperatures over about 1000° F. If the temperatures permit, these filters are used individually or in combination. An electrostatic precipitator is optionally used where the system pressure is at or near atmospheric. The synthesis gas recovered from the solids separation stage has reduced amounts of solids and is preferably substantially free of solids.

H. Detailed Description of the FIGURE

The invention will now be further described with the aid of the sole FIGURE which is a schematic representation of a two-stage quench zone according to the invention.

The FIGURE depicts a top portion of a slagging coal gasification reactor 5 connected to a first tubular quench zone 10 and a second tubular quench zone 15. Coal particles are partially oxidized in the reactor 5 to produce a first synthesis gas. The gas so produced has a temperature of about 1600° C. or greater and consists mainly of CO and $H_2$ but further contains $CO_2$, $H_2O$ and possibly $N_2$, as well as the finely dispersed molten slag particles. These particles are liquid at 1600° C. The first synthesis gas mixture passes from the reactor 5 to the first quench zone 10.

As seen in the FIGURE, a liquid carbonaceous quenching medium and carrier gas are introduced through the liquid carbonaceous quenching medium introduction inlets 20 in the wall of the first tubular quench zone near the joint between the reactor 5 and the first quench zone 10. The liquid carbonaceous quenching medium inlets 20 supply the liquid carbonaceous quenching medium and carrier gas mixture to the first quench zone. There are several liquid carbonaceous quenching medium introduction ducts 20 at different angles relevant to the quench zone center axis.

The liquid carbonaceous quenching medium is endothermically reacted with components of the first synthesis gas mixture. Additional synthesis gas is produced and mixes with the first synthesis gas mixture, resulting in a second synthesis gas mixture. This second synthesis gas mixture passes out of the first quench zone 10 into the second tubular quench zone 15. Through ports 25 in the wall of the second quench zone 15, a cooling gas is supplied. This cooling gas penetrates into the second synthesis gas mixture in the form of jets of gas. Ports 25 may have different diameters and are equally spaced around the circumference wall.

The second synthesis gas mixture is cooled by this cooling gas to a temperature from about 1000° F. to about 1900° F., at which the slag particles have lost their stickiness. The second synthesis gas is further cooled in a heat exchanger (not shown) and then the solid particles are removed by a cyclone and/or ceramic candle filter (not shown).

What is claimed is:

1. A process for quenching a first synthesis gas mixture comprising synthesis gas, molten flyash, water, and carbon dioxide and producing additional synthesis gas comprising:
   a. passing said first synthesis gas mixture into a first quench zone;
   b. introducing into said first quench zone a mixture of a major amount of a liquid carbonaceous quenching medium and a minor amount of carrier gas;
   c. endothermically reacting said carbonaceous quenching medium with said water and carbon dioxide in said synthesis gas mixture thereby producing additional synthesis gas comprising hydrogen and carbon monoxide and wherein said additional synthesis gas is admixed with said first synthesis gas mixture thereby forming a second synthesis gas mixture;
   d. passing said second synthesis gas mixture to a second quench zone, wherein said second synthesis gas mixture entering said second quench zone has a temperature from about 1900° F. to about 2400° F.;
   e. introducing into said second quench zone a cooling gas for admixture with said second synthesis gas mixture, thereby cooling said second synthesis gas mixture, solidifying said molten flyash, and thereby forming a third synthesis gas mixture; and
   f. passing said third synthesis gas mixture to a solids removal stage for removing the solidified flyash.

2. The process according to claim 1, wherein the weight ratio of carbonaceous quenching medium to carrier gas in said mixture in step (b) is at least 10 to 1.

3. The process according to claim 1, wherein the cooling gas is nitrogen, recycled cooled synthesis gas, water, or carbon dioxide.

4. The process according to claim 1, wherein the second quench zone is immediately downstream of the first quench zone.

5. The process according to claim 4, wherein the volume ratio between the flow of the second synthesis gas mixture and cooling gas ranges from about 1:0.1 to about 1:1.5.

6. The process according to claim 5, wherein the volume ratio between the flow of the second synthesis gas mixture and cooling gas is about 1:0.5.

7. The process according to claim 4, wherein the carrier gas is nitrogen or carbon dioxide.

8. The process according to claim 7, wherein said carrier gas is nitrogen.

9. The process according to claim 2, wherein said carbonaceous quenching medium is asphalt, gas oil, residual fuel oil, coal tar, or amines.

10. The process according to claim 5, wherein the cooling gas is injected at a linear velocity ranging from about 5 m/sec to about 30 m/sec.

11. The process according to claim 4, wherein the amount of carbonaceous quenching medium admixed with the first synthesis gas mixture is from about 0.5 to about 2 times the stoichiometric amount of carbonaceous quenching medium for the production of hydrogen and carbon monoxide from reaction of the carbonaceous quenching medium with the water and carbon dioxide in the first synthesis gas mixture.

12. The process according to claim 11, wherein the solids removal stage is a cyclone or filter.

13. The process according to claim 12, wherein the filter is a ceramic candle filter.

14. The process according to claim 3, wherein the temperature of the first synthesis gas mixture entering the first quench zone is from about 2650° F. to about 3000° F.

15. The method according to claim 14 wherein the temperature of the second synthesis gas mixture entering the second quench zone is from about 2100° F. to about 2400° F.

16. The method according to claim 15, wherein the temperature of the third synthesis gas mixture passing out of the second quench zone is from about 1000° F. to about 1900° F.

17. The method according to claim 3, wherein the pressure of the first synthesis gas mixture entering the first quench zone is greater than about 300 psig.

18. The method according to claim 17, wherein the pressure of the first synthesis gas mixture entering the first quench zone is from about 350 psig to about 450 psig.

19. A process for quenching a first synthesis gas mixture comprising synthesis gas, molten flyash, water, and carbon dioxide and producing additional synthesis gas comprising:
   a. passing said first synthesis gas mixture into a first quench zone;
   b. introducing into said quench zone a mixture of residual fuel oil and nitrogen, wherein the weight ratio of said residual fuel oil to nitrogen is at least 10 to 1;
   c. endothermically reacting said residual fuel oil with said water and carbon dioxide in said synthesis gas mixture thereby producing additional synthesis gas comprising hydrogen and carbon monoxide and wherein said additional synthesis gas is admixed with said first synthesis gas mixture thereby forming a second synthesis gas mixture having a temperature from about 1900° F. to about 2400° F.;
   d. passing said second synthesis gas mixture to a second quench zone;
   e. introducing into said second quench zone a cooling gas for admixture with said second synthesis gas mixture, thereby cooling said second synthesis gas mixture to a temperature of from about 1600° F. to about 1800° F., solidifying said molten flyash, and thereby forming a third synthesis gas mixture;
   f. passing said third synthesis gas mixture to a heat exchanger thereby cooling said third synthesis gas mixture to less than about 1000° F.; and g. passing said cooled third synthesis gas mixture to a ceramic candle filter for removing the solidified flyash.

20. The process according to claim 19 wherein the temperature of the second synthesis gas mixture entering the second quench zone is from about 2100° F. to about 2400° F.

* * * * *